United States Patent [19]
Danielson

[11] Patent Number: 5,736,725
[45] Date of Patent: *Apr. 7, 1998

[54] PORTABLE OPTICAL READER WITH MOTION SENSING SYSTEM AND METHOD

[75] Inventor: Arvin D. Danielson, Solon, Iowa

[73] Assignee: Norand Corporation, Cedar-Rapids, Iowa

[*] Notice: The term of this patent shall not extend beyond the expiration date of Pat. No. 5,534,684.

[21] Appl. No.: 677,155

[22] Filed: Jul. 9, 1996

Related U.S. Application Data

[63] Continuation of Ser. No. 311,483, Sep. 23, 1994, Pat. No. 5,534,684, which is a continuation-in-part of Ser. No. 303,333, Sep. 9, 1994, abandoned, which is a continuation-in-part of Ser. No. 298,257, Aug. 30, 1994, abandoned, and Ser. No. 300,178, Sep. 2, 1994, abandoned.

[51] Int. Cl.⁶ ............................................. G06K 7/10
[52] U.S. Cl. ................................. 235/462; 235/472
[58] Field of Search ................................. 235/462, 472, 235/463, 454, 470, 469

[56] References Cited

U.S. PATENT DOCUMENTS

| | | | |
|---|---|---|---|
| 4,282,425 | 8/1981 | Chadima, Jr. et al. | 235/462 |
| 4,672,215 | 6/1987 | Howard | 235/462 |
| 4,877,949 | 10/1989 | Danielson et al. | 235/462 |
| 5,010,241 | 4/1991 | Butterworth | 235/462 |
| 5,019,699 | 5/1991 | Koenck | 235/462 |
| 5,151,580 | 9/1992 | Metlitsky | 235/462 |
| 5,278,399 | 1/1994 | Sano | 235/472 |
| 5,308,966 | 5/1994 | Danielson et al. | 235/462 |
| 5,426,288 | 6/1995 | Obata et al. | 235/462 |
| 5,534,684 | 7/1996 | Danielson | 235/472 |

Primary Examiner—Donald T. Hajec
Assistant Examiner—Thien Minh Le
Attorney, Agent, or Firm—Lathrop & Gage L.C.

[57] ABSTRACT

A portable terminal unit of tablet configuration contains an optical reader for scanning two-dimensional information on a target area. The terminal unit has an optical window near an underside thereof and contains an optical reader having a given depth of field and field of view at a given range from the window. The apparatus includes a ranger for operably determining the range of the target area from the terminal unit and a controller for operably controlling activation of the reader. The controller may be configured to permit activation of the reader as: the target area is spaced within a certain tolerance range about an optimal focal length from the reader; the target area is spaced within the depth of field of the reader and motion of the terminal unit relative to the target area is halted; or the target area is spaced within the depth of field of the reader and motion of the terminal unit relative to the target area is reversed.

5 Claims, 6 Drawing Sheets

PORTABLE OPTICAL READER WITH MOTION SENSING SYSTEM AND METHOD

CROSS REFERENCE TO RELATED APPLICATION (Claiming Benefit Under 35 U.S.C. 120)

This application is a continuation of application for U.S. Pat. Ser. No. 08/311,483, filed 23 Sep. 1994, now U.S. Pat. No. 5,534,684, which is a continuation-in-part of application for U.S. Pat. Ser. No. 08/303,333, now abandoned, filed 9 Sep. 1994, which is a continuation-in-part of application for U.S. Pat. Ser. No. 08/298,257, filed 30 Aug. 1994, now abandoned, and also a continuation-in-part of application for U.S. Pat. Ser. No. 08/300,178, filed 2 Sep. 1994, now abandoned.

Incorporation By Reference

The following are incorporated herein by reference: U.S. Pat. No. 4,877,949, entitled "Hand-Held Instant Bar Code Reader System With Automated Focus Based On Distance Measurements" and issued 31 Oct. 1989 to Danielson et al., and U.S. Pat. No. 5,308,966, entitled "Hand-Held Instant Bar Code Reader Having Automatic Focus Control For Operation Over A Range of Distances" and issued 3 May 1994 to Danielson et al.

BACKGROUND OF THE INVENTION

1. Field of the Invention

The invention relates generally to code readers and particularly to readers which sense optically discernible symbol combinations or codes, such as bar codes and two-dimensional codes.

2. Discussion of the Related Art

Hand-held optical character reading equipment that has been available in the past has not performed well. The reader must be positioned and/or displaced accurately relative to the label for a valid read to occur. Operators usually "scrub" the label with the reader rather than carefully aligning the reader on the label, and often give up and manually key the information into the terminal.

The primary reason that accurate alignment is required is that the reader uses either a linear matrix of sensing elements, say sixty-four, or a rectangular matrix of sensing elements, say fourteen by forty. The recognition algorithms typically used in some of these systems assume that the sensor is oriented accurately over or across the character to be read with a misalignment of less than a relatively small angle. It is not surprising that few operators use the readers in this way, and that poor read rates and dissatisfaction with the criticality of the reader alignment during scanning, have been serious problems.

Although some progress has been made in the development of an optical character reader (OCR) product that has the capability to be operated portably, power consumption and circuit complexity remain as factors that have hindered development in this area.

Another complication with existing readers is the use of scanners by unskilled operators, or by operators who attempt to scan in haste due to an overburdened work schedule. As a result, inaccurate readings are taken which must be repeated, thereby losing some of the efficiency which might otherwise be available and which unnecessarily places a strain on available electrical energy.

What is needed is a reliable hand-held optical reader that prevents activation of the reader until it is within an acceptable range from a target area.

SUMMARY OF THE INVENTION

An improved apparatus and method is provided for a hand-held optical reader for reading optical indicia on a target surface, having a portable terminal unit of tablet configuration with an optical window near an underside thereof and an optical reader contained within said terminal unit. The optical reader is adapted to have a given depth of field and field of view at a given range from the window and to have an optical axis directed through the window such that at least a portion of the target area is operably encompassed within the field of view. The apparatus also includes a ranger for operably determining the range of the target area from the terminal unit and a controller to operably control, in conjunction with the ranger, activation of the reader by a user.

In some applications, the controller is adapted to permit activation of the reader if the target area is spaced within a certain tolerance range about an optimal focal length from the reader. In other applications, the controller is adapted to permit activation of the reader if the target area is spaced within the depth of field of the reader and motion of the terminal unit relative to the target area is halted. In yet other applications, the controller is adapted to permit activation of the reader if the target area is spaced within the depth of field of the reader and motion of the terminal unit relative to the target area is reversed.

Therefore, the principal objects and advantages of the present invention include: providing a terminal unit having a tablet configuration wherein a ranging mechanism operably determines the range of a target area from the terminal unit; providing such a terminal unit having a control mechanism such that a reader thereof cannot be activated until the terminal unit is within a certain range from a target area; providing such a terminal unit wherein a reader thereof cannot be activated unless the terminal unit is within a certain range from the target area and motion of the terminal unit relative to the target area stops; providing such a terminal unit wherein a reader thereof cannot be activated unless the terminal unit is within a certain range from the target area and motion of the terminal unit toward the target area is reversed; and providing such a terminal unit which is reliable, easy to use, efficient in operation and is particularly well adapted for the proposed use thereof.

Other principal objects, features and advantages of the invention will become apparent from the following description taken in connection with the accompanying drawings, wherein are set forth, by way of illustration and example, certain embodiments and features of this invention.

DETAILED DESCRIPTION OF THE INVENTION

With respect to each of the embodiments disclosed herein, the following related disclosures are hereby incorporated by reference in their entireties, including the drawings thereof: PCT/US93/02139, filed 10 Mar. 1993; PCT/US92/06157, filed 23 Jul. 1992; PCT/US93/12459, filed 12 Dec. 1993; and PCT/US94/05380, filed 11 May 1994. These incorporated disclosures describe techniques for assisting in aiming by displaying the field of view of a code reader for observation by the operator during aiming, and for using ranging marker beams to assist in automatically setting the focus of an optical system. These techniques may be employed for displaying on a display, confronting the user, the location of one or more marker spots as described herein and a target code or bullseye, to assist in aiming without direct viewing of the marker spot or spots by the operator. Also, the marker spot or spots as described herein can provide range information to the area-type sensors as described herein to enable automatic focus adjustment. With the marker beams active as described herein, the sensor and processing system can detect when the focus setting is correct and when the bullseye or other feature of the code is appropriately located, and automatically trigger the actual reader operation (with marker beams off) including any needed level of flash illumination of the code region.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The biggest negatives surrounding the use of portable OCR systems have related to the inherent weaknesses of the available hand-held scanner technology. The purpose of the described invention is to substantially improve the performance and capabilities of hand-held OCR scanners so that this inherently convenient coding method can become a viable alternative for automatic identification applications.

The invention consequently seeks to eliminate the need for accurately spacing the reader substantially perpendicularly to the codes being read. An OCR device in accordance with the invention would therefore desirably include a provision for instantaneously illuminating a region exterior to the reader, which region contains the combination of codes or characters to be read. Thus, during a single instance of illumination, the selective reflection representing relatively darker and lighter elements of the code configuration to be read may be imaged or focused with suitable optics at an interior region within the reader, the interior region being referred to also as an imaging area.

An array of photosensor elements is disposed at the interior imaging area. The photosensor elements receive during that instant of illumination from any information at the exterior region a complete light image or optical image at the interior region. The instantaneous transfer of the image to the imaging area substantially eliminates risk of error due to an operator causing an inadvertent movement of the reader. A possible source of error in aiming was recognized, however. Such source of error may be minimized, if not totally eliminated, when an operator can obliquely scan the coded information in a manner whereby the reader does not interfere with the operator's view of the coded information and whereby any rectilinear distortion of the generated image arising from the oblique scanning can be automatically and electronically corrected. In accordance with the invention, it is, consequently, contemplated to identify or mark the region from which optical information would be transferred to the area array of photosensor elements or photosensor array and to automatically and electrically correct for any rectilinear distortion arising from such oblique scanning.

As a specific example, marker beams originating from light sources at the four corners of the photosensor array may be projected via suitable optics onto a supporting surface carrying the information, such as a label, to be read. The beam of the light sources may be shaped optically, such as by non-spherical lenses associated with the light sources to linearize the marker spots impinging the surface containing the information. In the case of a marker beam of elongate, linearized cross section, the light sources need not be located at the corners of the photosensor array, though conveniently the optics for projecting and focusing the image of information onto the photosensor array may be used. The marker beams bracket the optical field of view of the photosensor array, desirably in alignment with the periphery thereof. Consequently any information, such as contained on bar code or two-dimensional coded labels, within the region bounded by the marker beams, is necessarily projected or focused onto the photosensor array.

Once the image is focused on the photosensor array, the output of each photosensor element may be electrically read and stored in accordance with data processing techniques. However, it needs to be pointed out that the recorded or stored image is a "raw image", as it was received during the instance of illumination. The image may contain an image of dirt spots which may have adhered to portions of a bar code, for example.

One advantage of the OCR device over traditional scanner units is that an entire area of the code has been recorded or stored. A scanner typically operates to read a line or section through a bar code, for example. A number of repeat readings may be employed to achieve an average reading. However, with a more complex unit providing for such repeated scanning operations, any movement during these repeat readings would tend to dilute the accuracy of any of the readings. Hence, with an OCR device the image representing the entire information becomes fixed instantaneously with electronics of the reader. Subsequently any number of readings may be taken and verified from the fixed or stored information. Also, any data manipulation may be performed in accordance with known data processing techniques to transform the stored image to a clearly recognizable data code.

Another advantage is being realized with respect to recently developing trends in the code marking art. With increasing understanding of data processing techniques for inventory handling and merchandising operations in general, a need has emerged to pack more information into each single code combination or code cluster. Recent developments suggest replacing conventional single line bar codes with multi-line bar code patterns having a more densely packed configuration. Codes having these new configurations are generally known as "stacked bar codes." Simply stated, stacked bar codes are compressed in the direction perpendicular to the reading direction and are arranged in a multi-line stacked configuration, like a page of printed material. A number of differing standards for bar codes exist, two of which are known as "Code 49" and "16K". Code 49 may consist of stacked lines or rows of code indicia two to eight rows high, while the 16K code may use stacked rows of code indicia between two and sixteen rows high.

It is understandable that with conventional code scanners, reading scanned codes at angles other than perfect alignment with the linear arrangement of the codes may present code recognition problems. Of course, if less than the entire code information is recognized, the entire code is typically indicated as not having been read, so that a re-read cycle must be initiated. Since valuable time may be lost by repeating reading operations, it is of course desirable to recognize the code. Since a code may also not have been recognized because of a lateral shift of the active area of the scanner away from the label configuration, either the angular misalignment or a lateral shift may be a cause for non-recognition of the code.

It is apparent that the current invention is particularly advantageous for reading the described "stacked bar codes" as well as other two-dimensional information. The referred-to marker beams are able to indicate or show when the entire code pattern is within the region from which an image of the code pattern can be transferred to the photosensor array. Hence, a major source of error is eliminated. Secondly, the instantaneous focusing of the information on the photosensor array reduces the risk of error caused by inadvertent movement of the reader during a prolonged process. Thirdly, since typical data processing techniques permit the code to be aligned electronically after it has become stored in the reader, critical alignment requirements are no longer needed for information to be read from the stored code image. Fourth, one or more of the marker beams may be directed to converge toward an optical axis of the OCR device, thereby providing an operator with information as to whether the OCR device should be moved toward or away from the surface containing the code pattern. Fifth, a greater line density of photosensors is used to compensate for corresponding foreshortening of the relative spacing in the generated image of off-baseline elements of the coded information as herein provided, to provide substantially distortion-free, obliquely scanned images.

Initial processing of the image is a normalization process which sometimes also may be referred to as "calibration". During calibration, the orientation of the image, distortion arising from oblique scanning, and blemishes, such as dirt spots, may be recognized and electronically reoriented and neutralized, as appropriate, in accordance with known data processing techniques. The image may also be transferred to desired electronic data banks.

Figure 1:
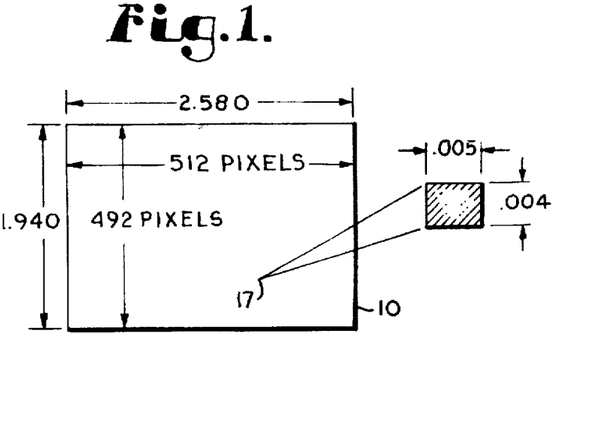
FIG. 1 is a diagram for illustrating the optical sensing area as is defined by a field of view of a lens system, such as from the use of a typical solid state video imaging array and a lens system with a magnification ratio of ten to one, in a hand-held optical reader in accordance with the present invention.

In FIG. 1, an optical sensing area is delineated which represents the result of the use of a typical solid state video imaging array with a lens system that provides a magnification ratio of ten to one. The resultant active area is 2.58 inches×1.94 inches as indicated.

Figure 2:
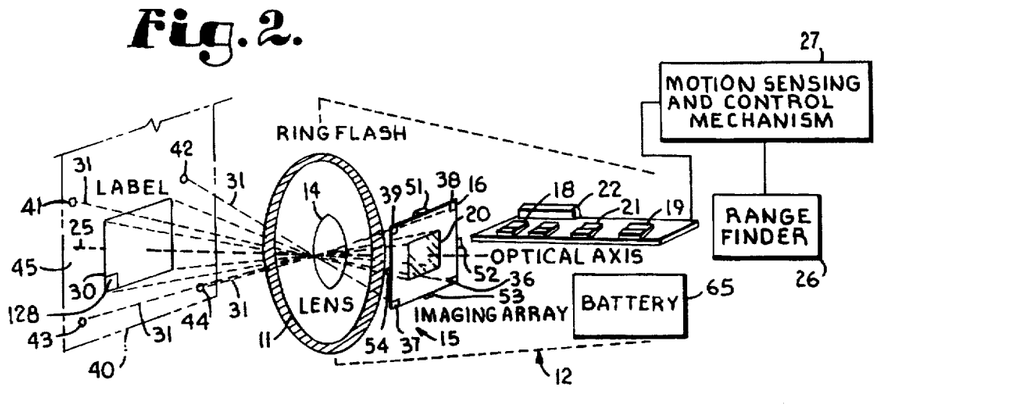
FIG. 2 is a diagrammatic illustration of a preferred form of a hand-held optical reader in accordance with the present invention, arranged so as to have its optical sensing area or field of view completely encompassing the machine-readable code (e.g. bar code) or human-readable information (e.g. line or lines of text) on a label so that a complete instantaneous optical image thereof is projected onto an area array of photosensors within the reader and may be converted by the reader into digital image data and stored in a processor memory of the reader and diagrammatically showing a range finder and motion sensing and control mechanism thereof.

FIG. 2 shows a diagrammatic view of an optical system that incorporates the components described. The ring flash is a preferred light source for its ability to provide relatively uniform illumination with minimum backscatter into the imaging device. Also, it may be "wrapped" around the lens, as shown, providing a compact, efficient package. The imaging array may be placed directly in line with the optical axis of the reader, so that the optical portion of a hand-held reader can be quite compact.

Operation of the reader consists of the user "aiming" at the target label and activating a switch to initiate the read. The flashtube is effective to provide an essentially instantaneous illumination, so movement of the hand-held reader during this time is noncritical. The digital processor immediately begins clocking the imaging array to read its contents which correspond to the intensity of the light from the active sensing area that was focused on the imaging array. The actual output of the imaging array is normally an analog signal. Since only white or dark information is needed, the conversion decision may consist of a comparator circuit with appropriately selected bandwidth and hysteresis to correspond to the characteristics of the imaging circuit output.

The digital information is assembled into a manageable format, such as sixteen bit data words corresponding to the word length of the digital processor and stored directly into the processor memory array. For example, an entire image may consist of 492 lines of 512 samples each for a total 251,904 bits or 31,488 bytes of information, as illustrated in FIG. 1. Once the image acquisition process is complete, the digital processor may then begin operating on the image information to remove blemish and noise components, rotate the image to a normalized position, correct for optical skew due to curvature of the target label or reading from an off-axis angle as described herein, and the like, to optimize the pattern recognition process. An important feature of the described system is the ability of the digital processor to detect during such discussed normalization the locations of blemishes or flaws in the image sensing array and to store those locations in a non-volatile memory so that flawed image data may be masked or compensated to remove such errors from consideration in the recognition algorithms.

When image normalization is complete, the recognition process may then be initiated. The first level of recognition is to determine whether the coded information is a bar code or a line of characters or two-dimensional coded information, for example. If a bar code is recognized, standard bar code decode algorithms may be employed; if a character format is recognized, a character recognition algorithm is invoked; etc.

The digital processor employed for the image normalization, processing and recognition functions must be extremely fast and efficient for acceptable user satisfaction. A processor, such as a Texas Instruments TMS320C25 type which is designed for digital signal processing applications and has extremely fast execution speeds while operating with acceptable power consumption levels for a portable hand-held unit, is used to address external program and data memory, and to perform bit and word manipulations.

Referring first generally to FIG. 2, there is illustrated somewhat schematically a hand-held area-type optical reader. The reader is also sometimes referred to as an improved Optical Character Reader ("OCR") device. The reader, as will be explained, is capable of reading all the characters, bar codes or other information at an optical sensing area such as indicated at 10 in FIG. 1, essentially instantaneously. The area 10 to be read may be illuminated by light from a ring-type illuminator 11, preferably a xenon flash tube. The reader shown schematically as a hand-held scanner unit 12, indicated by dash lines, may house the light source 11, and suitable optics, such as a lens 14. The optics 14 include a focal plane at an interior region 15 of the scanner unit or reader 12.

A solid-state area-type photosensor array, such as indicated at 16, is disposed in the focal plane defined by the interior region 15. The photosensor array 16 is comprised of a plurality of photosensor elements arranged in an area corresponding in the sensing area 10 externally of the reader 12 to respective pixels, such as at 17, FIG. 1. The individual photosensor elements or pixels in the area array of photosensor elements or photosensor array 16 may have a density, such as in typical video cameras. Thus, the sensing area 10, as an external projection of the photosensor array 16, is enlarged with respect to the photosensor array 16 in accordance with a magnification ratio, such as ten to one, of optics of such video cameras. However, even with such enlargement of the sensing area 10, the number of pixels 17 illustrated in FIG. 1 provide a resolution of individual pixel of 0.004 inch by 0.005 inch (four mils high by five mils wide).

Figure 4:
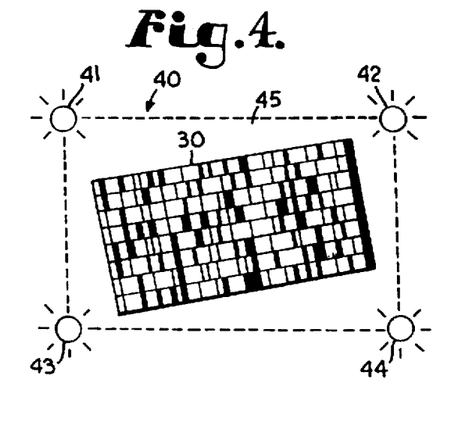
FIG. 4 is an illustration of a stacked bar code and of one of the manners in which a field of view of the optical reader is indicated to a user to facilitate alignment of the field of view with a label bearing indicia such as the stacked bar code.
Figure 5:
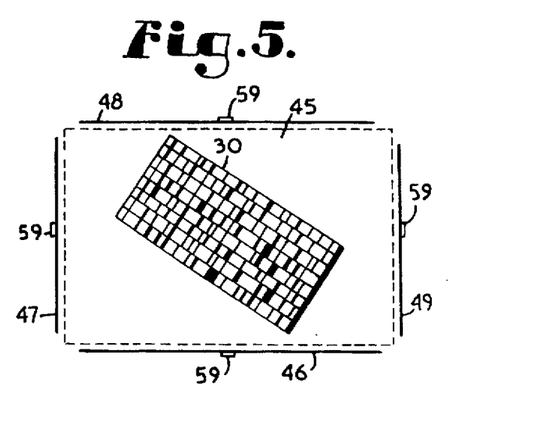
FIG. 5 is an illustration of an alternate manner for indicating to a user of the optical reader the field of view of the information gathering elements in accordance with the invention.
Figure 6:
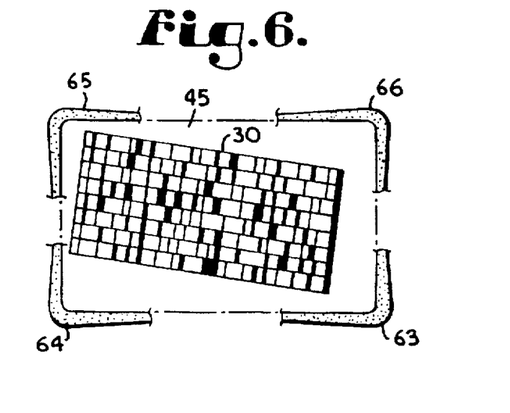
FIG. 6 is an illustration of yet another manner for indicating the field of view of the optical reader.

Once the flash energization of the light source 11 is complete, the photosensor array 16 may be read out, each line of photosensor elements of the array being shifted out serially for example, and the respective lines of photosensor elements being read out in parallel for example to an analog/logic interface component 18 within the hand-held scanner unit 12. A signal processor 19, such as the referred to Texas Instruments TMS320C25 signal processor type, disposed in the scanner unit 12 and connected with the analog/logic interface component 18, may receive from the focussed information image, e.g., at 20, FIG. 2, the area image data and supply the raw area image data to an associated memory 21 in the hand-held scanner unit 12 for subsequent processing in the hand-held unit. As an alternative, the raw area image data (e.g., in digital form) may be coupled via an RF or optical link 22 to a host processor (not indicated) for storage and processing. Such a separate host processor may also be portable and carried by the user.

Where the focussed information image 20, such as that of a bar code or stacked bar code as shown in FIGS. 4 through 6, on the photosensor array 16 is tilted relative to the longitudinal (widthwise) axis of the array 16, the raw image data as stored in digital form may be subsequently processed so as to be rotated into a normal horizontal disposition prior to decoding thereof by well-known algorithms.

In reference to FIG. 2, the flash tube 11 and the lens 14 may have circular symmetry relative to their common longitudinal axis 25 which is consequently also the optical axis of the reader Hence the illuminator or flash tube 11 is disposed annularly about the optics represented by the lens 14, so that any angle of tilt of label 30 about axis 25 is not detrimental to uniform optical imaging of the entire information field of the label 30.

Marker beams 31 originating from light sources 36, 37, 38 and 39 at the four corners of area photosensor array 16 may be projected onto a supporting surface 40 carrying label 30, via optics 14, to produce visually discernible indicia, such as marker spots 41, 42, 43 and 44, respectively, so that array 16 may be readily aligned relative to area information, e.g., on label 30, as the hand-held unit 12 is being moved into proximity thereto.

By way of example, the light sources 36–39 may be light emitting diodes at the four corners of the photosensor array 16, which light emitting diodes may be sequentially pulsed so that the marker spots 41–44 are each produced at a repetition rate of sixty per second when the hand-held scanner unit is placed in a target seeking mode. Once the four marker spots "bracket" the information to be read, as indicated in FIGS. 2 and 4 through 6, regardless of tilt, or regardless of whether the information extends horizontally or vertically, the light source 11 may be triggered, marker spots 41–44 being extinguished by this time, or the wavelength thereof being prevented from affecting the photosensor array by filtering, for example.

As long as the marker spots 41 through 44 bracket the information to be read, e.g., information on the label 30, the image 20 of the entire information field is necessarily focussed on the active or photosensitive area of the photosensor array 16. It should be understood that only the information and not the entire label 30 needs to become located within an area 45 of the supporting surface 40 bounded by the marker spots 41 through 44. FIG. 4 shows a stacked bar code label 30 disposed within the area 45 bracketed by the marker spots 41 through 44. Hence the image of the information represented by the stacked bars of the label 30 is projected onto and becomes focussed on the active area of the photosensor array 16. Though the information is captured within the area 45 at an angle, the image 20 will still be focussed on the photosensor array 16. Hence the entire image 20 with all information bearing dark and light configuration combinations of the code can be read into memory locations of the memory 21.

One manner in which the marker spots 41 through 44 define the area 45, such as described with respect to FIG. 2, is also illustrated in FIG. 4. The area 45 as indicated by dashed lines is bracketed at its corners by the marker spots 41 through 44. Thus, to line up indicia to be read, such as the stacked bar code label 30, an operator would aim the marker spots 41 through 44 so that information on the label does not extend to or beyond a straight line between two adjacent ones of the marker spots.

FIG. 5 illustrates another manner of delineating the area 45. In lieu of the marker spots 41 through 44, FIG. 5 shows linear illumination bars 46, 47, 48 and 49 which closely bound the area 45, as depicted again by the dashed lines. It may be preferred to mark the area 45 by a linear illumination outline comprised of the illumination bars 46 through 49 in that the photosensor array may be allowed to contain an uninterrupted matrix without the need to preserve corner locations thereof for the light emitting diode as described with respect to FIG. 4.

Briefly referring back to FIG. 2, the illumination spots or bars 46 through 49 may be produced by light sources, such as light emitting diodes or laser diodes in combination with linear lenses, which may be disposed in the focal plane 15 at midpoints of each of the edges of and directly adjacent the photosensor array 16, as indicated by the numerals 51, 52, 53 and 54 respectively. Thus, as with respect to the earlier described example, the optics 14 may be used to direct light beams resulting in the marker bars 46 through 49 through the optics 14 against the surface 40.

FIG. 5 shows the label 30 disposed at an increased angle with respect to the major outline of the area 45 and of a smaller size. Again, the criterion for focussing information on the active area of the photosensor array 16 is to aim the field of view of the reader 12 as identified to the user by the marker indicia, such as the described spots or bars, so as to place the information to be read entirely within the area 45. If the angular alignment of the label 30 is less than that illustrated in FIG. 4, and is disposed at an angle with respect to the illustrated rectangular shape of the active field of view in FIG. 5, the user may simply back off the reader 12 away from the surface 40 until the entire information area of the label 30 is contained within the area 45.

An increased distance between the label 30 and the reader 12 results in a smaller image of information being focussed on the photosensor array 16. However, as the label 30 shown in FIG. 4, the entire label 30 in FIG. 5 will become focused on the photosensor array 16. The flash illumination by the referred to xenon flash tube 11 may be chosen to allow the "f-stop" of the optics 14 to be stopped down such that the depth of field of the reader is increased to allow the image 20 to become focused on the photosensor array 16 even though the distance between the reader 12 and the supporting surface 40 may vary for example, between two inches to well in excess of one foot. It may further be found convenient to use currently known and available automatic focusing techniques to further increase the ability of the reader to focus the image 20 over a yet further increased range of distances of several feet between the indicia to be read and the reader 12. Such increase in versatility of the reader 12 would result, of course, in a corresponding increase in the cost of the reader.

Figure 7:
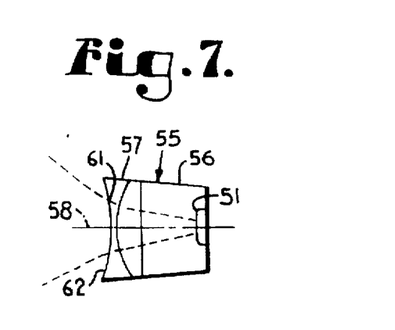
FIG. 7 shows a schematically simplified view of a light source and related linear optics for delineating the field of view of the optical reader as further described herein.

FIG. 7 illustrates a light source (such as shown at 51 through 54 in FIG. 2), say source 51, more generally identified as light source assembly 55, in combination with a typical molded casing 56 including a lens 57 for linearly expanding the light emitted from the source 51 in one or more directions away from its optical axis 58. Thus, as illustrated in FIG. 5, the light emitted, from the sources 51 through 54 is expanded linearly from center points shown at 59 into two directions disposed at a 180 degree angle.

It may also be possible to change the angle between the two legs 61 and 62 (FIG. 7) from 180 degrees to, for example, a right angle between the two directions of expansion of the emitted light. With such modification, the expansion direction 62 would be directed into the plane or out of the plane of the drawing of FIG. 7. The configuration of marker spots 63, 64, 65 and 66 in FIG. 6 illustrate a right angle expansion of the light emitted through correspondingly configured lenses 57. In the configuration of the marker spots 63 through 66, the corresponding light sources would be located again at the corners of the photosensor array 16, as shown with respect to the light sources 36 through 39, for example.

It would be expected that the intensity of the linearly deflected or expanded light decreases with the distance from the optical center of the non-deflected light beam. Thus, as shown in FIG. 5, the corners of the area delineated by the marker bars 46 through 49 may not be illuminated by the marker bars, while the centers of the sides of the area 45 shown in FIG. 6 may not be illuminated or only slightly illuminated relatively to more brightly illuminated corners by the respective marker spots 63 through 66. FIG. 6 also shows the label 30 disposed entirely within the area 45 delineated by the marker spots 63 through 66.

While FIGS. 4 through 6 show a somewhat rectangular configuration of the marker spots or bars, a square configuration with a correspondingly square configuration of the photosensor array 16 may be preferred. However, the particular shape of the photosensor array 16 and the marked or delineated area 45 are not critical, as long as the area 45 delineated by the marker spots defines the active area 20 disposed in the interior of the reader 12.

As described, a complete label, e.g., five inches high by five inches wide, having a complete bar code, or row or rows of characters thereon or other two-dimensional arrangement, can be focussed onto the operative area of a complete image photosensor array, such as 16, in response to a single essentially instantaneous flash of a light source, such as 11. A relatively larger sized label 30, would simply require an operator of the reader to increase the distance between the reader 12 and the label to be read.

In some applications, the height dimension of the complete image area array 16 may be such that a complete area information image including the entire area information width, e.g., of an eighty column line of characters, can be read whether the width of the information image is disposed widthwise or height wise or diagonally on the photosensor array 16. In general, such area information is focusable on the photosensor array 16 in any angular orientation about the optical axis 25. By way of example, a label 30 containing all its information in an area of square configuration 1.3 inches on a side could be disposed so that its width extended horizontally or vertically or at an acute angle on the photosensor array 16 and in each case the entire contents of the label could be read with a single flash of light source 11.

Preferably the hand-held unit 12 contains batteries "BATTERY" (schematically indicated in FIG. 2 at 67) with sufficient energy so as to supply the flashable light source means 11 and the other components of the hand-held unit, so that the unit is essentially self-contained and free of any connecting cable or the like.

The system of FIG. 2 may be provided with an autofocus ranging system, as already referred to above, so that the reader 12 may have the ability to read at extended distances, e.g., up to forty-eight inches and possibly even greater distances, and may also be capable of reading a wider range of target areas. Autofocus systems are common in 35 mm cameras.

The hand-held scanner unit 12 of FIG. 2 may contain the programming to recognize several types of optically discernible indicia of information, such as bar codes as well as conventional character fonts and other two-dimensional information, and to automatically select the appropriate decoding algorithm from those available in its on-board stored program. Furthermore, the hand-held unit 12 may contain an area array photosensor 16 of size and resolution so as to register the above-mentioned multiple lines of characters, e.g., eight lines of eighty characters each at one time. Preferably, the entire information field to be scanned, or instantaneously to be recorded or read, such as represented by label 30 in FIG. 2, is illuminated simultaneously by a brief flash of highly intense light source such as the xenon tube 11.

The reading of bar codes with a complete area photosensor array such as 16, enables the digital data representing a bar code, for example, to be rotated and otherwise normalized as a complete entity prior to decoding, such that the normalized data may correspond to that obtained by sequentially scanning along a bar code parallel to the longitudinal bar code axis at a multiplicity of levels separated center to center, e.g., by four mils. By combining the corresponding data points at different levels, e.g., on an averaging basis., defects in the bar code image can be reliably overcome such as defects due to foreign matter, spurious marking and the like. Again, the bar code can be disposed at any random angle relative to the reader during the reading operation, speeding the reading of the labels, reducing operator fatigue and increasing the number of labels which can be read during a working day.

Figure 3:
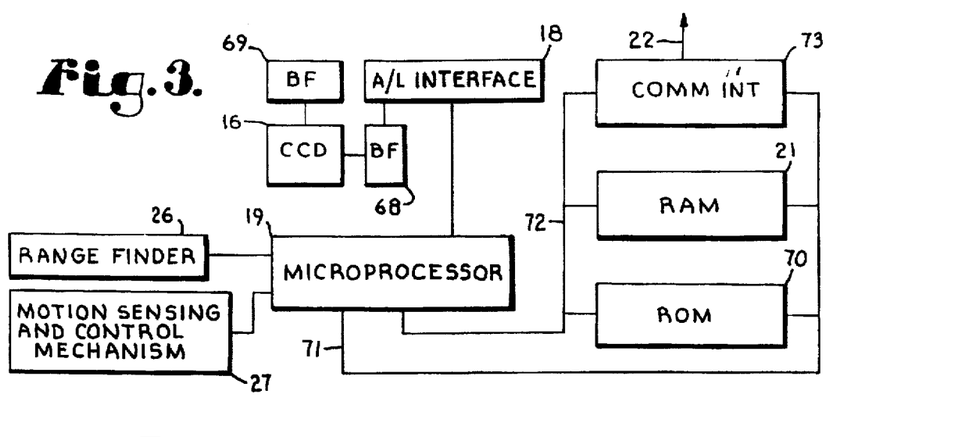
FIG. 3 is a block diagram illustrating a typical logic arrangement of a microprocessor circuit and major functional components as are typically associated with such a circuit, and further illustrating an interface between the array of photosensors of the reader as referred to in FIG. 2 and the microprocessor and the range finder and motion sensing and control mechanism thereof.

FIG. 3 is a simplified functional block diagram showing the photosensor array ("CCD") 16 coupled through typical driver circuits ("BF") 68 and 69 to the analog/logic interface ("A/L INTERFACE") 18. The data signal output from such typical interface circuit 18 would be coupled directly to the above referred-to microprocessor circuit ("MICROPROCESSOR") 19, such as a processor TMS320C25 as provided by Texas Instruments. It is to be understood that other devices may be available and may be substituted therefor. For example, the device 19 may provide 4K words of On-Chip Program ROM and 544 words of programmable On-Chip RAM.

Typically, such minimum ROM (Read Only Memory) and RAM (Random Access Memory) may be supplemented with further programmable memory, such as the memory ("RAM") 21, and with additional read only memory ("ROM") 70. The processor circuit 19 may address and transfer such additional memory by typical address and data buses 71 and 72, respectively. Data may also be transferred to a suitable communication interface ("COMM.INT.") 73, which in turn is coupled to the above referred-to communication link 22, which may be an RF or an optical link. It should be understood that the specifically described elements and their functions are merely for explanatory purposes and various changes may be possible within the scope hereof.

Figure 8:
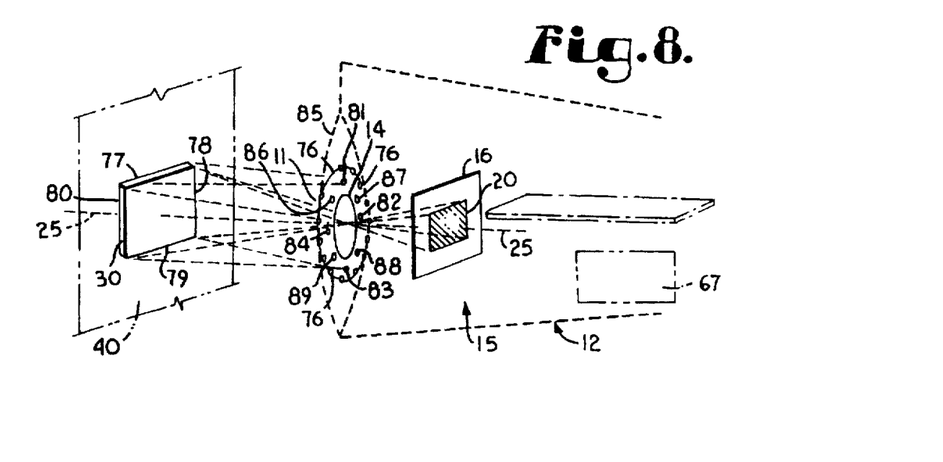
FIG. 8 is a diagrammatic illustration showing the reader of FIG. 2 and illustrating alternative embodiments relating to flashable light sources and aiming aids such as marker sources.

As a further example, FIG. 8, similarly to that shown in FIG. 2, shows the supporting surface 40 with the label 30, such as a stacked bar code, for example, in relationship to the hand-held optical reader unit 12. The reader unit 12 also preferably includes typical optics 14 and a photosensor array 16 disposed in a focal plane at an interior plane or region 15 behind the optics 14. An image 20 of information representative of the information on the label 30 may be formed on the photosensor array 16 when the reader 12 is activated by instantaneously illuminating an area ahead of the reader 12 and hence the supporting surface 40 in the region of the label 30 when the reader optical axis 25 is aimed toward the label 30. The illuminator 11 is generally a flashable xenon tube which may, of course, comprise any number of flash type illuminators 11.

FIG. 8 therefore illustrates an annular illuminator 11 which is comprised of a number of discrete pulsable light emitting diodes 76. The light emitting diodes are preferably disposed adjacent the exterior portion of the optics 14 of the reader 12 in a plane perpendicular to the optical axis 25, substantially similar to the arrangement of the xenon flash tube shown in FIG. 2. The number of discrete light emitting elements 76 may be chosen to correspond to a total light intensity needed to illuminate the exterior region of the label 30. Depending on the desired range over which the reader 12 is to function, the number of discrete devices may be increased by closer spaces between adjacent ones of the light emitting diodes 76.

FIG. 8 illustrates another change in the described arrangement with respect to the previously described marker sources, such as the light emitting diodes 36 through 39 or the light sources 55 including lenses 57. Even though it is presently considered advantageous to project beams from the marker sources through the optics 14, within reason it is possible to also project marker spots or bars, such as bars 77, 78, 79 or 80, against the surface 40 from respective marker light sources 81, 82, 83 and 84 without having the projected beams directed through the optics 14 of the reader 12. Thus, the marker light sources 81 through 84 may be disposed externally of the optics 14 and on a frontal portion 85 of the reader 12. The lenses 57 of the light sources 81 through 84 may be disposed to direct the respective marker beams of the light sources substantially along the periphery of the field of view of the optics 14 of the reader 12.

As described with respect to FIG. 7, the lenses 57 may be shaped to linearly shape the emitted light of the marker sources in two mutually opposite directions or at an angle other than 180 degrees, depending on the location of the light sources. A disadvantage may possibly be noticed in that the marker sources are not in total alignment with the periphery of the field of view of the optics 14. Consequently, at extremes of an operating range of the reader 12, resulting marker bars or spots, such as the marker bars 77 through 80 shown in FIG. 8, may not delineate precisely the area 45 which corresponds precisely to the active photosensor array 16 projected against the surface 40 through the optics 14. However, only at close range, the marker spots or bars 77 through 80 may form on the surface 40 somewhat externally of the actual area 45, hence indicating an area larger than one that may be read by the reader 12. When the sources are properly placed, such deviation may be confined to a range at which normally no readings are taken. At a medium range, the marker bars may be disposed to clearly delineate the area 45. Similarly, an area smaller than the actual area 45 may be indicated at an extended distance for reading the label 30. Thus, for practical purposes the marker sources may be oriented such that the predetermined area 45 is bracketed for substantially all readings.

It should be understood that not only light sources for generating the bars 77 through 80 may be disposed externally of the optics 14, but light sources disposed to project marker beams generally to corners of the rectangular area 45 may be disposed externally of the optics 14. Such alternate light sources 86, 87, 88 and 89 may similarly be disposed as closely as feasible adjacent the optics, and actually may be disposed within the annular configuration of flashable illuminator source elements 76, as shown in FIG. 8. With respect to the latter sources, lenses 57 may be disposed to linearly expand the respective marker beams at right angles so as to bracket the area 45 as indicated in FIG. 6, for example. It should be understood that various other changes suggest themselves from the arrangements as disclosed herein.

Figure 9:
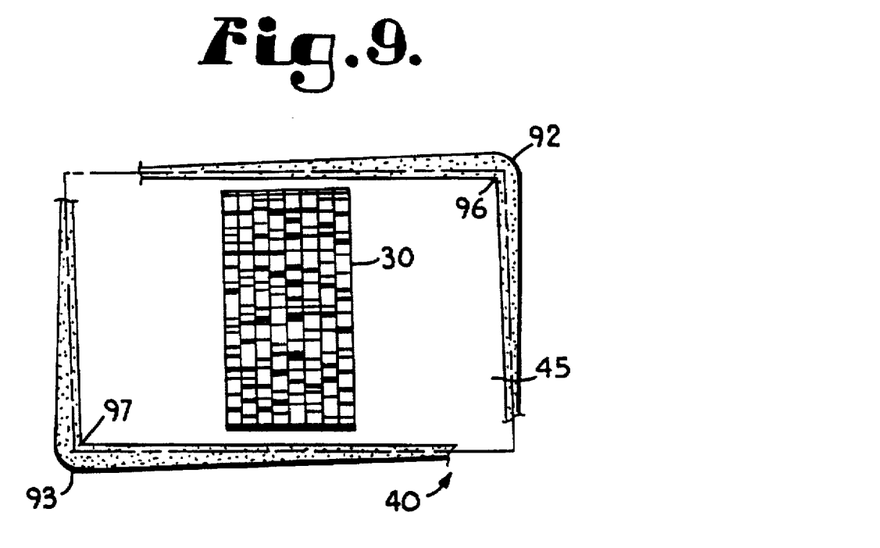
FIG. 9 shows another embodiment for delineating to a user of the reader its field of view, also showing a stacked bar code label encompassed in a vertical orientation within the delineated field of view.
Figure 10:
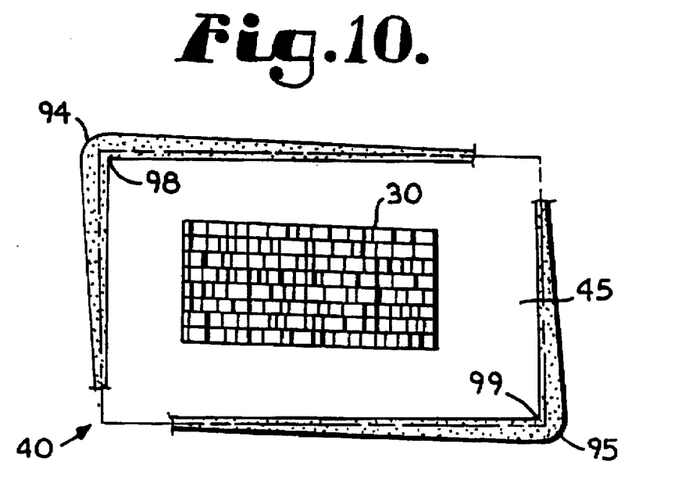
FIG. 10 shows a variation of the embodiment of FIG. 9 for delineating the field of view of the reader, also showing a stacked bar code label encompassed in a horizontal orientation within the delineated field of view.

As an example of changes or variations in delineating the area 45 within the field of view of the reader 12, the marker sources may be advantageously limited in numbers. FIGS. 9 and 10 depict an example of another arrangement of marker sources, the respective impinging marker spots being identified by numerals 92 and 93 in FIG. 9 and by numerals 94 and 95 in FIG. 10. In each of these arrangements, the marker sources are disposed to generate marker beams impinging on the surface 40 as the respective marker spots 92, 93, 94 and 95 with the earlier described right angle expansion from diagonally opposite corners 96 and 97 of the delineated area 45 as shown in FIG. 9, and from corners 98 and 99 of such area 45 as shown in FIG. 10. Also, the orientation of the label 30 depicts a substantially vertical or heightwise arrangement with respect to the area 45 in FIG. 9, and a substantially horizontal or widthwise arrangement of the label 30 with respect to the area 45 in FIG. 10. The different orientations of the respective label 30 in each instance further illustrate the above described advantage of the reader 12 in providing for the capture of an area of information on the photosensor array 16 independent of the orientation of such information about the optical axis 25 of the reader 12.

With respect to the shape of the photosensor array 16, photosensor arrays of the current state of the art are generally of rectangular shape or at least the active areas are of rectangular shape. While an embodiment discloses a generally circular lens or optics 14, the shape thereof is preferred because of the generally rectangular shapes of so-called targets or photosensor arrays 16 of video cameras. It should be understood that the invention in its broad scope may not depend on a sensing area of any particular shape.

The ability to capture and manipulate an entire image with a portable unit has important benefits for optical character reading also. In such instances, a reading area of elongate rectangular shape may be preferred. For example, the described embodiments allow the use of image enhancement algorithms, e.g., of the type developed for enhancement of deep space probe images, as well as image normalization, e.g., such as image rotation and scaling. Non-linear scaling for improving recognition efficiency with respect to irregular surfaces such as curved surfaces, and with respect to off-axis viewing angles as herein described, is also feasible.

Figure 11:
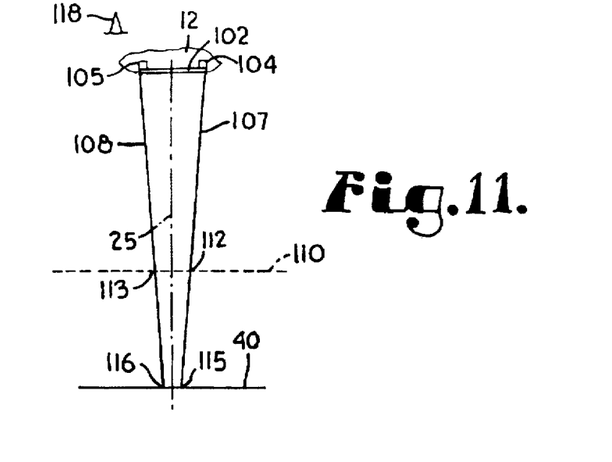
FIG. 11 shows a pair of marker beams converging toward an optical axis of the optical reader as a function of the spacing of the optical reader from a target area, in accordance with the present invention.

In some applications, it may be desirable to use a handheld optical reader having a fixed focal length, such as for example a Delivery Information Acquisition Device ("DIAD") as provided by United Parcel Service of America, having a focal length of approximately 8.5 inches from a window 102 thereof and a depth of focus of approximately $\pm 2$ inches. In that event, spacing of the reader 12 becomes substantially more critical. For such applications, the present invention provides at least one of the light sources 38, such as light sources 104 or 105 as shown in FIG. 11, wherein the respective beam, 107 or 108, converges toward the longitudinal optical axis 25. As the supporting surface 40 is moved toward the window 102 of the reader 12 such as, for example, spacing the supporting surface 40 at the phantom line indicated by the numeral 110 in FIG. 11, a marker spot 112 or 113 cast on the supporting surface 40 is spaced farther from the longitudinal axis 25 than the corresponding marker spots 115 and 116 for the supporting surface 40 spaced as shown.

Figure 12A:
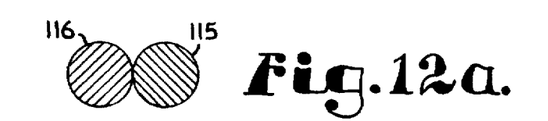
FIG. 12a–12d shows a schematic representation of the relationship of marker spots cast on the target area as the spacing between the optical reader and the target area is varied.

As an example of the arrangement shown in FIG. 11, assume the arrangement illustrated therein as incorporated into a DIAD reader having a focal length of 8.5 inches and a target area of 6.5 inches wide by 4.0 inches high. Further assume that the light sources 104 and 105 are disposed along the wide ends of the window 102 such that the marker spots 115 and 116 are cast on the supporting surface 40. Also assume that both of the light sources 104 and 105 are operative and the resultant beams 107 and 108 therefrom converge toward each other and toward the longitudinal axis 25 such that the marker spots 115 and 116 touch each other, as shown in FIG. 12a, as the reader 12 is spaced at the optimum focal distance from the supporting surface 40, such as at 8.5 inches.

Figure 12B:
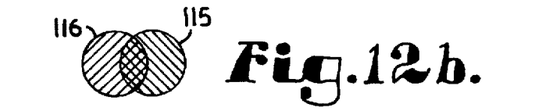
Figure 12C:
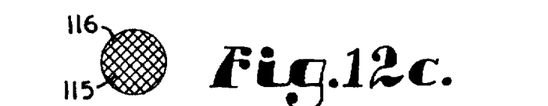

Now assume that the reader 12 is moved farther away from the supporting surface 40 such that the marker spots 115 and 116 overlap, as shown in FIG. 12b. If the reader 12 is moved even farther away from the supporting surface 40, a distance will be reached whereby the marker spots 115 and 116 coincide as shown in FIG. 12c. Similarly if the reader 12 is moved closer than the optimum focal distance from the supporting surface 40, the marker spots 115 and 116 will move apart. In other words, it would be visibly obvious to a user of the present invention, by observing the relationship between the two marker spots 115 and 116, to know which direction the reader 12 must be moved relative to the supporting surface 40 in order to bring the target area 45 into optimum focus.

Figure 12D:
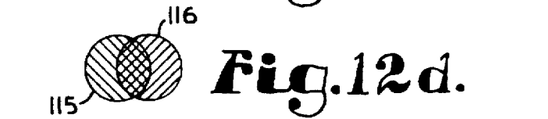

In some applications it may be preferable to adjust the convergents of the beams 107 and 108 such that the marker spots 115 and 116 coincide, as shown in FIG. 12c, as the reader 12 is spaced at the optimum focal distance from the supporting surface 40. In that event, the overlapping relationship shown in FIG. 12b would exist as the reader 12 is spaced closer than the optimum focal distance from the supporting surface 40, whereas the overlapping relationship shown in FIG. 12d would exist as the reader 12 is spaced farther than the optimum focal distance from the supporting surface 40.

For such an application, it may be preferable to use light sources which cast colored marker spots 115 and 116, e.g., red and blue, such that the switching in positions of the colored marker spots 112 and 113 would indicated that the reader 12 has been displaced through the optimum focal distance from the supporting surface 40.

As an example of the size of the marker spots 115 and 116, if the spots 115 and 116 have a diameter of approximately ¼ inch at the window 102, then those spots would have a maximum dimension of approximately ½ inch at a distance of approximately 10 inches from the window 102. As a result, the marker spots 112 and 113 are easily visible to a user of the reader 12.

If the reader 12 is being used such that the longitudinal axis 25 is substantially perpendicular to the supporting surface 40, the view of the marker spots 115 and 116 from a user's eye spaced at 118, as shown at FIG. 11, may be somewhat obstructed by the reader 12. As a result the user may need to position his head somewhat to the side of the reader 12 in order to see the relationship of the marker spots 115 and 116 on the supporting surface 40. If, however, the reader 12 is of the type that reads at an oblique angle, then the user can view the marker spots 115 and 116 without obstruction from the reader 12 by sighting along the hand-held unit 12.

Figure 13:
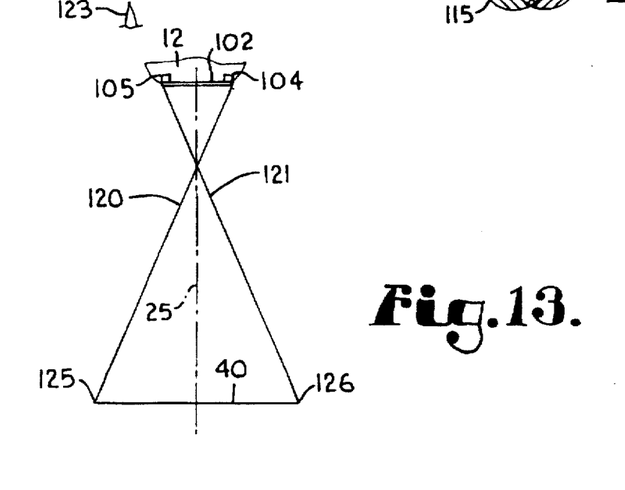
FIG. 13 shows a pair of marker beams crossing the optical axis between the optical reader and the target area.

For those applications wherein the reader 12 is used with the longitudinal axis 25 spaced substantially perpendicularly to the supporting surface 40, then the light sources 104 and 105 may be arranged whereby the respective beams 120 and 121 therefrom converge toward and cross over the longitudinal axis 25 at a distance from the window 102 which is less than the preferable focal length of the reader 12. Thus, a viewer having an eye spaced at 123, as shown at FIG. 13, has an unobstructed view of a marker spot 125 cast by the light source 104. In that event, the user can sight along the side of the reader 12 to determine whether the spacing of the marker spot 125 corresponds with marker spots normally observed as the reader 12 is spaced at the optimum distance from the supporting surface 40. If the marker spot 125 is too closely spaced to the longitudinal axis 25, that indicates to the user that the reader 12 must be moved farther away from the supporting surface 40 causing the marker spot 125 to move outwardly to the relative spacing normally observed at the optimum spacing of the reader 12 from the supporting surface 40. Similarly, if the user observes that the marker spot 125 is spaced too far outwardly from the longitudinal axis 25 relative to the spacing normally observed as the reader 12 is properly spaced from the supporting surface 40, then it is obvious that the reader 12 should be moved closer to the supporting surface 40 in order to realize the optimum focal distance for the reader 12.

In the example just described, only one of the light sources 104 and 105 are required. The DIAD device hereinbefore mentioned has an arrangement whereby the light sources 104 and 105 can be individually operated such that each of the light sources 104 or 105 can be separately used, such as using one of the light sources 104 or 105 for left-handed operation and using the other one of the light sources 105 or 104 for right-handed operation. By using only one light source in those situations, the energy drain on the portable power supply of the reader 12 can be substantially reduced.

It is to be understood that an application of the invention as indicated in FIG. 13 may be arranged whereby the marker spots 125 and 126 may be cast either inside or outside of the sensing area 10 as desired.

For some applications it may be desirable to use a bullseye 128. The bullseye 128 may have any configuration such as that described in U.S. Pat. No. 4,896,029, issued Jan. 23, 1990 to Chandler, et al. In that event, the bullseye 128 may be comprised of concentric rings having an outer diameter of approximately 8 millimeters. For those applications using a bullseye and one of the marker beams 107 or 108, the spacing of the corresponding marker spots 115 or 116 may be utilized to not only space the reader 12 at the appropriate distance from the supporting surface 40 but may also be used to space the reader 12 appropriately relative to the target area 30 by manually moving the reader 12 such that the marker spot 115 or 116 is superimposed on the bullseye 128.

Similarly, one of the readers 12, having two of the marker beams 107 and 108 such that both of the makers spots 115 and 116 are cast on the supporting surface 40, may be utilized to not only properly space the reader 12 relative to the supporting surface 40, but may also be used to position the reader 12 relative to the label 30 by placing the marker spots 115 and 116 over the bullseye 128, or one at each side thereof as desired.

Figure 14:
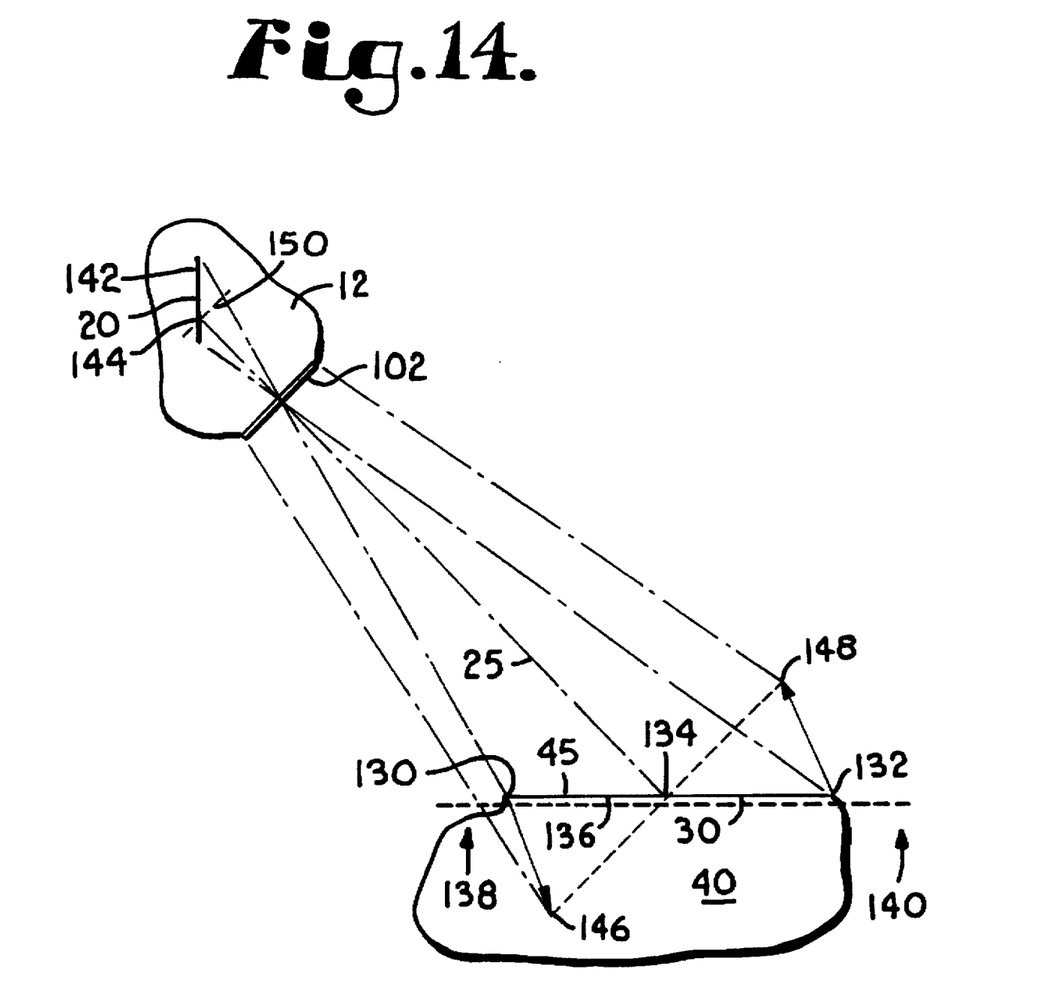
FIG. 14 shows a schematic representation of the optical reader being used to obliquely scan the target area and an effective re-oriented image electronically generated therefrom.

For those applications wherein the reader 12 is used with the longitudinal axis 25 oriented obliquely to the target area 45, such as the arrangement schematically illustrated in FIG. 14, the generated image 20 will be skewed or distorted. For example, assume that the optical axis 25 lies in the plane of FIG. 14. Also assume that the label 30 being scanned has a leftmost extremity 130 and a rightmost extremity 132 as viewed edgewise in FIG. 14, wherein both of the extremities 130 and 132 are disposed within the depth of focus of the optical scanner 12. Then, the coded information lying in the plane of the label 30 along a line perpendicular to the optical axis 25, i.e., perpendicular to the plane of FIG. 14 as indicated by the reference numeral 134, sometimes referred to herein as the baseline or undistorted axis, is basically undistorted from the viewpoint of the optical reader 12. On the other hand, coded information spaced off-baseline with a coordinate along a distorted axis 136 perpendicular to the undistorted axis 134, such as between the extremities 130 and 132, is distorted relative to the viewpoint of the optical reader 12. The distortion appears as an apparent foreshortening of respective rectilinear spacing of various elements of the coded information of the label 30 from the undistorted axis 134.

The magnitude of the overall distortion is dependent upon the degree of obliqueness at which the label 30 is being scanned; the greater the obliqueness, the greater the distortion. In addition, the magnitude of the distortion is dependent upon the spacing of the label 30 within the field of view of the optical reader 12. Coded information spaced near the back of the field of view, as indicated by the numeral 138 in FIG. 14, will generally be distorted to a greater extent than coded information spaced near the front of the field of view, as indicated by the numeral 140 in FIG. 14.

In effect, the generated image 20 is preferentially magnified along an axis 142, corresponding to the distorted axis 136, to a greater extent than it is along an axis 144, perpendicular to the plane of FIG. 14, corresponding to the undistorted axis 134 of the label 30.

For example, an optical reader 12 with its optical axis 25 arranged perpendicularly to the target area 45 may have a substantially uniform magnification of ten-to-one over the generated image, as hereinbefore described. As the reader 12 is being used for oblique scanning, the distortion can be corrected as follows: 1) by increasing the magnification of the generated image 20 to greater than ten-to-one along the axis 142 corresponding to the distorted axis 136 while maintaining the magnification at ten-to-one along the axis 144 corresponding to the undistorted axis 134; 2) by maintaining the magnification at ten-to-one along the axis 142 corresponding to the distorted axis 136 while decreasing the magnification to less than ten-to-one along the axis 144 corresponding to the undistorted axis 134; or 3) by increasing the magnification to greater than ten-to-one along the axis 142 corresponding to the distorted axis 136 while decreasing the magnification to less than ten-to-one along the axis 144 corresponding to the undistorted axis 134. The relative change (s) in magnification is, of course, dependent upon which of the three methods are used, the angle at which the oblique scanning is conducted, the spacing of the label 30 or other coded information within the field of view of the optical reader 12, etc.

The arrangement illustrated in FIG. 14 corrects the distortion caused by oblique scanning by providing the reader 12 with increased resolution (number of pixels per row and column) of the sensor 16 to electronically modify the apparent height-to-width ratio of the generated image 20 to more closely correspond to the height-to-width ratio of the label 30. Preferably, the height-to-width ratio of the corrected image 150 is similar to that of the label 30. It is to be understood, however, that it is unnecessary for some applications to reconstruct the generated image such that it has a height-to-width ratio exactly equal to that of the coded information being scanned. For those cases, it is only necessary to enlarge the generated image 20 along the axis 142 corresponding to the distorted axis 136 of the obliquely scanned label 30 whereby the coded information thereon can be accurately and reproducibly read by the reader 12.

Such electronic correction of the oblique-scanning distortion, in effect, is substantially equivalent to physical rotation of the label 30 about the axis 134 such that the extremities 130 and 132 appear, from the viewpoint of the reader 12, to be respectively spaced as illustrated by the numerals 146 and 148 in FIG. 14.

Alternatively, the sensor may also be oriented obliquely, such that the plane of the sensor substantially coincides with the plane of the generated image 20 as shown in FIG. 14. In that event, the distortion caused by oblique scanning may be sufficiently automatically corrected with the sensor obliquely oriented whereby further distortion correction processing is unnecessary.

Preferably, the coded information is approximately centered along the optical axis to avoid additional distortion which might otherwise be caused by spacing the coded information nearer the rear of the field of view as hereinbefore mentioned and thereby minimizing variation of distortion within the scanned image of the coded information arising from portions of the coded information being positioned nearer the rear of the field of view than other portions of the coded information. For example, although scanning with the optical axis at an oblique angle of 45° is within the scope of the present invention, scanning with the optical axis at an oblique angle of 30° provides a scanned image with reduced depth variation, which would otherwise result due to portions of the coded information being positioned more closely to the rear of the field of view than other portions thereof.

It is to be understood that the original height-to width ratio of the label 30 or other two-dimensional coded information may be included as an integral part of the coded information, such as the bullseye hereinbefore mentioned. In that event, such ratio would be designed such that it could be accurately read without correction at any angle of obliqueness within the range of oblique scanning angles available to a particular optical reader. Then, having scanned and processed that ratio information, the associated componentry of the optical reader 12 as herein described can be utilized to automatically correct for the oblique distortion as herein described.

For example, algorithms can be provided which identify a bullseye constructed of concentric circularly shaped rings, as hereinbefore described. Due to oblique scanning, the scanned image of the bullseye will appear oval-shaped instead of circular. The algorithms can electronically compare the maximum dimension of the oval-shaped image with the minimum dimension thereof, and determine the magnitude and the axis (or axes) along which the magnification of the image must be increased (and/or decreased) in order to adjust the height-to-width ratio of the scanned image to substantially match the height-to-width ratio of the label 30 within acceptable limits for accurate reading of the label 30 as hereinbefore described.

It is to be understood that, in addition to or instead of a bullseye, the outline of the label 30 itself may be used as a reference of the magnitude of distortion arising from oblique scanning. For example, a 1"×1" two-dimensional code, such as that described in U.S. Pat. No. 4,896,029, issued Jan. 23, 1990 to Chandler et al. (col. 10, lines 60–67), which is incorporated herein by reference, can provide such a reference. By electronically comparing the ratio of the apparent height to width ratio of an image scanned from one of the Chandler-type codes, the magnitude of preferential magnification needed to sufficiently correct the obliqueness distortion can be determined.

Figure 15:
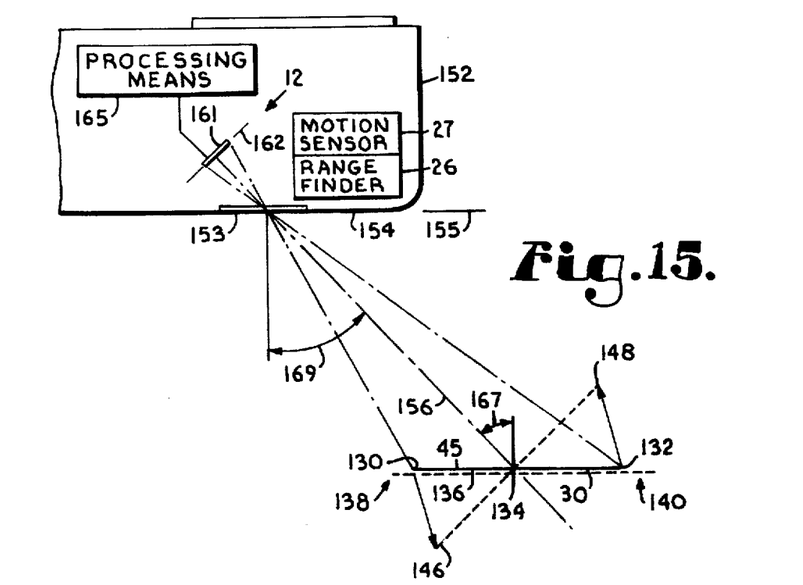
FIG. 15 shows a schematic representation of the optical reader being used to obliquely scan the target area, similar to that shown in FIG. 14, showing an image sensor oriented perpendicularly to the optical axis thereof, in accordance with the present invention.
Figure 16:
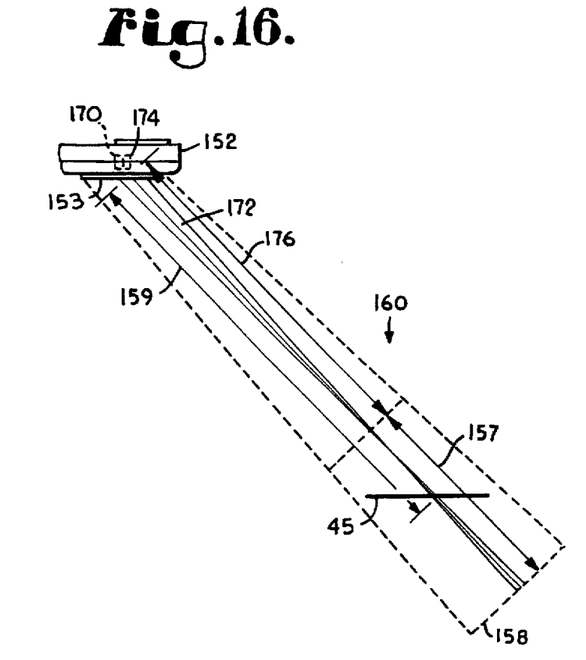
FIG. 16 shows a schematic representation of a side elevational view of a laser scanner of the optical reader being used to obliquely scan the target, in accordance with the present invention.
Figure 17:
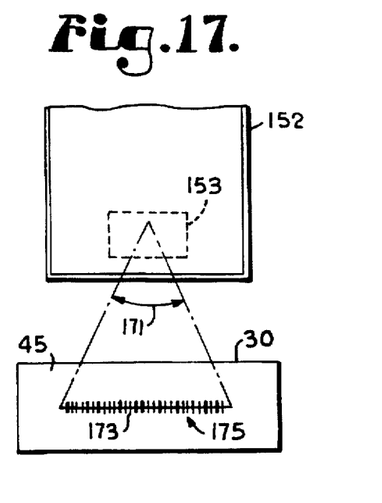
FIG. 17 shows a fragmentary, top view of a tablet configuration terminal unit showing the laser scanner projecting a linear mark on a linear bar code, in accordance with the present invention.

The primary emphasis of the present invention also involves oblique scanning of the label 30 or other coded information with a hand-held terminal unit 152 containing the optical reader 12, as illustrated in FIGS. 15–17. Many of the features of the present invention are similar to those hereinbefore described, particularly those in regard to FIG. 14, and will not be reiterated here in detail.

The hand-held terminal unit 152 permits accurate scanning of images from optical indicia on a target surface oriented obliquely to the optical axis of the reader by substantially eliminating image distortion normally inherent in such oblique scanning. Preferably, the portable terminal unit 152 has a tablet configuration as appropriately sized dimensions of the hand-held terminal unit 152, such as a width of six to seven inches, are an essential factor to be taken into consideration, particularly as an aid for easily and conveniently aiming the unit 152 at the label 30. For example, the DIAD device, hereinbefore mentioned and having a width, length and thickness of approximately 6.7, 12 and 1.44 inches, respectively, has such dimensions.

The terminal unit 152 also has an optical window 153 disposed at or near an underside 154 thereof defining a major plane 155, an optical axis 156 directed obliquely through the window 153, and a given depth of field 157 and field of view 158 at a given range 159 from the window 153, as illustrated in FIG. 16. For example, the reader 12 contained in the unit 152 may have a fixed focal length of 8.5 inches and a depth of field of 4.0 inches, such that the non-close-up range as hereinafter described extends from a range 6.5 inches to 10.5 inches. As the terminal unit 152 is disposed with the major plane 155 oriented substantially horizontally, as illustrated in FIGS. 15 and 16, at least a portion 160 of the field of view 158 of the optical reader 12 is horizontally displaced from the terminal unit 152.

The optical reader 12 has an area-type image sensor 161 disposed substantially perpendicularly to the optical axis 156, as illustrated in FIG. 15, which tends to optimize the focus of the optical reader 12 on a portion of the target surface 45, which is horizontally offset from the terminal unit 152 and is intersected by the optical axis 156 as the target surface 45 is disposed obliquely to the optical axis 156. It is to be understood that the present invention is equally applicable to applications where the target surface 45 is disposed perpendicularly to the optical axis 156. The image sensor 161 defines a sensor plane 162.

The terminal unit 152 also includes processing means 165, as hereinbefore described, for transforming an image, scanned from a portion of the target surface 45, disposed substantially parallel to the major plane 155, into a generated image effectively corresponding to an image which would be obtained if the portion of the target surface 45 had been oriented substantially perpendicularly to the optical axis 156.

The processing means 165 includes a decode processor capable of decoding a two-dimensional code for an angular deviation 167 of the optical axis 156 from a normal line perpendicular to the plane of the coded label 30 by a maximum angle not greater than an angle 169 of the optical axis 156 relative to a normal line perpendicular to the major plane 155 of the terminal unit 152, as illustrated in FIG. 15.

For some applications, the terminal unit 152 has a converging ranging marker beam 31, which crosses the optical axis 156 and produces a linear mark 47 on the target surface 45 at a distance from the optical axis 156 wherein said distance is a function of the range 159 of the target surface 45 from the terminal unit 152, substantially similar to that hereinbefore described and as illustrated in FIGS. 11 and 13.

Focussing by use of ranging marker beams, which can be readily combined with the obliqueness correction of the present invention, are hereinbefore described and will not be re-iterated here in detail. It is to be understood that automatic focussing techniques, which are well-known in the art, can also be combined with the various embodiments described herein.

The improved apparatus may also include a laser scanner 170, such as a laser diode oscillating through an angle 171 as illustrated in FIG. 17, which is adapted to generate and direct a fan-shaped pattern with a laser beam 172, such as perpendicularly to the plane of FIG. 17, to produce a linear mark 173 and a reflected laser light sensor 174 responsive to the laser scanner 170, wherein the laser scanner 170 is adapted to generate a linear bar code signal in the event that the linear mark 173 coincides with a linear bar code 175 on the target surface 45.

Further, the laser scanner 170 and reflected laser light sensor 174 may be adapted to be responsive to a close-in range of positions of the linear bar code 175 along the optical axis 156 wherein the area-type image sensor 161 is ineffective for reading the linear bar code 175, such as within a range 176 which lies outside of, and nearer to the terminal unit 152 than, the depth of field 157, as illustrated in FIG. 16.

The laser scanner 170 can be utilized to automatically determine the range 159 of the target area 45, by methods described herein or as known in the trade. If the target area 45 is determined to be close-up, the label 30 can be substantially simultaneously scanned for the linear bar code 175 and a signal, therefrom, as detected by the reflected laser light sensor 174 as a function of the reflected light from the laser beam 172, can be processed as hereinbefore described.

Similarly, if the target area 45 is non-close-up, such that compact or two-dimensional area codes on the label 30 can be accurately read by the reader 12, such as where the target area 45 lies within the depth of field 157 and within the field of view 158, the laser beam scanner 170 can be automatically deactivated, with processing of the scanned image proceeding as hereinbefore described.

The current invention includes the steps for reading indicia, including linear bar codes and compact area codes on a label, as described herein. Those steps include activating the laser beam scanner 170 to generate and direct a laser beam 172, which is capable of scanning linear bar codes and compact area codes at close-up distances and positioning the terminal unit 152, which contains the laser beam scanner 170 and which is capable of generating and directing a field of view on or about the label 30, so that the generated and directed laser beam 172 intersects the label 30. The improved method may also include the steps of utilizing the laser beam 172 to determine whether the unit 152 is spaced close-up to the label 30 such that the compact area codes on the label 30 cannot be accurately read by the reader 12 or whether the unit 152 is spaced non-close-up to the label 30 such that the compact area codes on the label 30 can be accurately read by the reader 12; and scanning the label 30 and storing a signal obtained as a function of reflected light from the laser beam 172 as the label 30 is spaced close-up to the unit 152, and deactivating the laser beam scanner 170 and registering the field-of-view on or about the label 30 as the label 30 is spaced non-close-up to the unit 152.

Typically, a user of the portable terminal unit 12 having a tablet configuration moves the unit 12 from out of range of the target area 40 toward the indicia 30 on the target area 40. As the unit 12 is brought into range of the target area 40, for example 10.5 inches therefrom, the reader 12 is typically triggered even though the reader 12 may not be spaced at the optimum focus distance from the target area 40, such as for one of the readers 12 having a fixed focal length of 8.5 inches and a depth of field of 4 inches. The terminal units 12 having a range finder 26 which indicates that the unit 12 is outside of an acceptable range from the target area 40, such as closer than 6.5 inches or farther than 10.5 inches for the example reader, then the unit 40 may also include a motion sensing and control mechanism 27 adapted to prevent triggering of the reader 12 until the reader 12 is within an acceptable range, such as between 6.5 to 10.5 inches from the target area 40.

Preferably, for one of the readers 12 having a fixed focus, the motion sensing and control mechanism 27 is adapted to permit triggering of the reader 12 as the unit 12 is spaced from the target area 40 within a tighter tolerance range about the optimal focus length, such as within 8.5 ±0.5 inches for the example reader 12. Also, the motion sensing and control mechanism 27 may be adapted to determine when the unit 12 is spaced such that the target area 48 is within the depth of field of the reader 12 and, even though the unit 12 may not spaced within the aforesaid tighter tolerance range, the motion sensing and control mechanism 27 may permit triggering of the reader 12 should it determine that the user has stopped the motion of the unit 12 or, alternatively, has reversed the motion of the unit 12 such that the reader 12 is being moved farther away from the tighter tolerance range.

For example, the unit 12 may include sensors and software with appropriate algorithms to detect and compare the spacing and change of spacing of the marker spots 115 and 116, as illustrated in FIGS. 12a–12d, to determine range of the unit 12 from the target area 40 and, further, to determine movement toward or away from, or, indeed, non-movement of, the unit 12 relative to the target area 40.

It will be apparent that many modifications and variations may be effected without departing from the teachings and concepts of the present disclosure.

I claim as my invention:

1. A terminal unit capable of imaging optical indicia located on a target surface, comprising:

a) an optical reader having a known depth of field;

b) a housing with an optical window for permitting light to enter said housing and be received by said optical reader;

c) a range finder for determining distance to the target surface; and d) a motion detection system for determining whether the distance to the target surface is changing;

activation of said optical reader being permitted if said motion detection system determines that the distance to the target surface is not changing and said range finder determines that the target surface is within said optical reader's depth of field.

2. A terminal unit capable of imaging optical indicia located on a target surface, comprising:

a) an optical reader having a known depth of field and an optimal focus length defining an optimal focus location;

b) a housing with an optical window for permitting light to enter said housing and be received by said optical reader;

c) a range finder for determining distance to the target surface; and d) a motion detection system for registering a change in the distance to the target surface;

activation of said optical reader being permitted if said motion detection system determines that the target surface is moving away from the optimal focus location and said range finder determines that the target surface is within said optical reader's depth of field.

3. A terminal unit capable of imaging optical indicia located on a target surface, comprising:

a) an optical reader having a known depth of field and an optimal focus length defining an optimal focus location;

b) a housing with an optical window for permitting light to enter said housing and be received by said optical reader;

c) a range finder for determining distance to the target surface; and d) a motion detection system for determining whether the distance to the target surface is changing;

activation of said optical reader being permitted if said range finder determines that the target surface has moved within a given tolerance range about the optimal focus location, the given tolerance range having been selected to fall within said optical reader's depth of field.

4. A method for imaging optical indicia contained on a target surface, comprising the steps of:

a) determining the distance to the target surface;

b) determining whether the distance to the target surface is changing; and c) permitting activation of an optical reader, to capture an image of the target surface, if it is determined that the distance to the target surface is not changing and that the target surface is within the optical reader's depth of field.

5. A method for imaging optical indicia contained on a target surface, comprising the steps of:

a) determining an optimal focus location for an optical reader having a known depth of field and an optimal focus length;

b) determining the distance to the target surface;

c) determining whether the distance to the target surface is changing; and d) permitting activation of the optical reader, to capture an image of the target surface, if it is determined that a target surface is moving away from the optimal focus location and that the target surface is within the optical reader's depth of field.

* * * * *